United States Patent

[11] 3,598,374

[72] Inventor Robin G. F. Nauta
     Stamford, Conn.
[21] Appl. No. 863,815
[22] Filed Oct. 6, 1969
[45] Patented Aug. 10, 1971
[73] Assignee Dorr-Oliver Inc.
     Stamford, Conn.

[54] FLUIDIZED BED REACTOR WITH PREHEATING OF FLUIDIZING AIR
     13 Claims, 8 Drawing Figs.
[52] U.S. Cl. .................................. 263/21 A, 34/57 A
[51] Int. Cl. .................................. F27b 15/00
[50] Field of Search .................................. 34/10, 57, 57 A, 57 B; 263/21, 21 A; 165/175

[56] References Cited
UNITED STATES PATENTS

| | | | |
|---|---|---|---|
| 2,587,720 | 3/1952 | Fritzberg | 165/175 X |
| 2,715,282 | 8/1955 | Niven, Jr | 34/57 A X |
| 2,763,478 | 9/1956 | Parry | 34/57 A X |
| 2,985,515 | 5/1961 | McKinley | 34/10 X |

FOREIGN PATENTS

| 445,014 | 6/1927 | Germany | 263/21 A |
|---|---|---|---|

Primary Examiner—Charles J. Myhre
Attorneys—Theordore M. Jablon and D. M. Mezzapelle ABSTRACT: A fluidized bed reactor for carrying out an oxidizing reaction of materials maintained in a fluidized state on a constriction plate, by fluidizing air forced upwardly through the constriction plate, and preheated by being forced through a heat exchange tube system located in the free board space of the reaction chamber, exposed to the heat of the reaction gases in the free board space as well as to radiation heat from refractory-lined reactor walls.

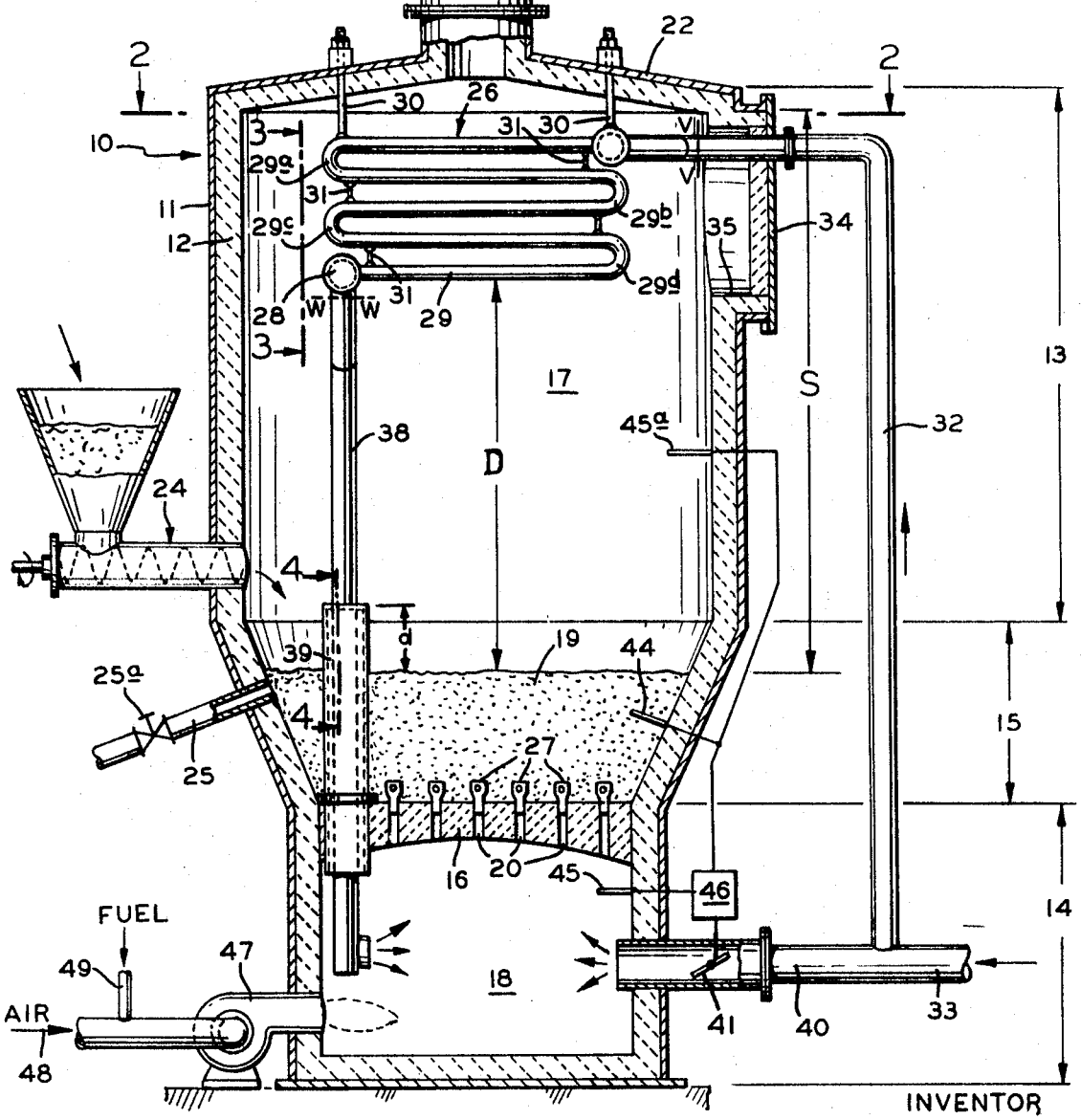

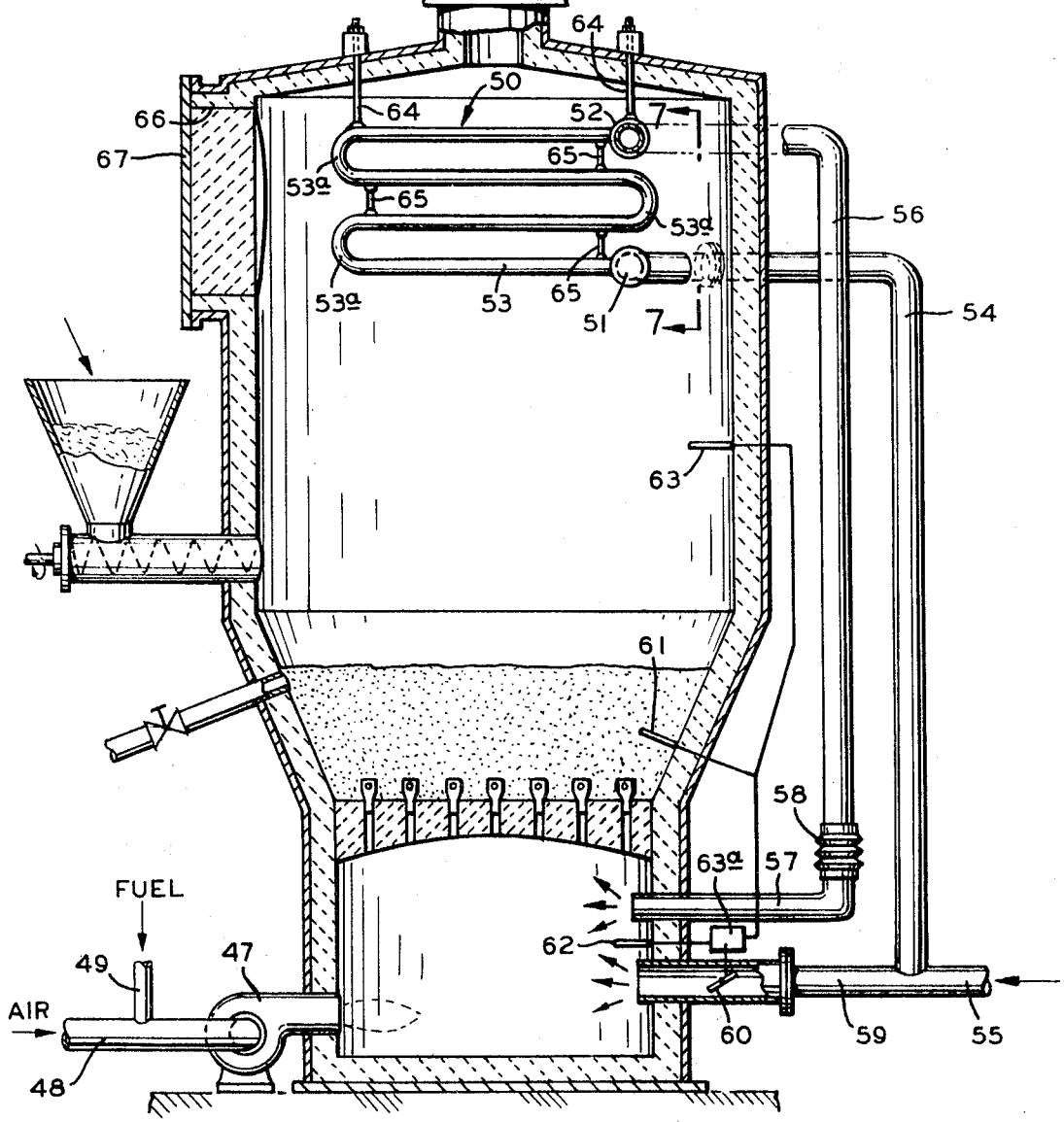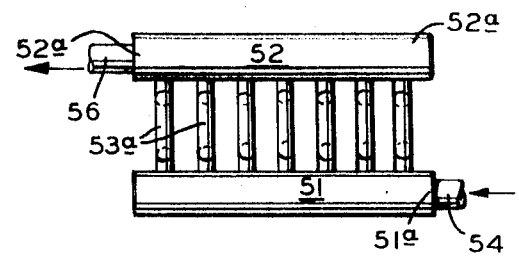
INVENTOR.
ROBIN G.F. NAUTA
BY Theodore M. Jablon
ATTORNEY.

PATENTED AUG 10 1971 3,598,374

INVENTOR.
ROBIN G. F. NAUTA

BY Theodore M. Jablon
ATTORNEY.

FLUIDIZED BED REACTOR WITH PREHEATING OF FLUIDIZING AIR

This invention relates to continuously operating reactors wherein a bed of solid particles is treated or reacted with a fluidizing gas supplied under pressure to a wind box which supports the bed in a state of fluidization.

From the wind box the gases rise through constrictions, nozzles or tuyeres into a reaction chamber zone above, where the material to be treated is being fed continuously into the reaction zone or bed, while the solid and/or gaseous reaction products are continuously removed.

The behavior appearance, and physical characteristics of the bed of hot fluidized material are comparable to those of a body of boiling liquid the specific gravity of which depends upon the density at which the bed is maintained by the upflowing fluidizing gas.

The spent hot fluidizing gases along with dust particles blown from the bed escape as stack gases from the top end of the reactor unit. The dust particles in the stack gases are usually trapped in a cyclone followed by a scrubber. The wind box gas pressure must be high enough to overcome the sum total of flow resistance, including the pressure differential across the constriction plate plus the differential needed for sustaining the fluidized condition of the bed.

More particular, this invention is applicable to fluidizing treatment operations employing air as the fluidizing gas in a process of oxidation. Conventionally, heat from the stack gases is utilized to preheat the fluidizing or combustion air for the sake of thermal efficiency and economy of the operation, inasmuch as the recovered heat is returned into the fluidized bed.

Such air preheater units commonly consist of a tube system having a cool air inlet and a hot air outlet for the air passing therethrough, which tube system is enclosed by a casing constructed and arranged for the passage of the stack gases therethrough. The construction, size, and capacity of these air preheater units must be suited to the requirements of the particular reactor with which they are to be associated.

Examples of fluidized bed operation, applicable to this invention are found in metallurgical operations such as the partial roasting of sulfide ores, for instance copper sulfides, where only part of the sulfur is burned off in the reaction zone or bed, with sulfuric acid subsequently recovering from the spent fluidizing gas.

In another instance, if the purpose of the operations calling for an air preheater, be one of waste disposal by combustion, an example may be found in the combustion of dewatered moist sewage sludge in a fluidized bed of red hot sand, according to U.S. Pat. to Albertson & Budd, No. 3,319,586.

In another application of the invention, the material is heated while fluidized by inert hot combustion gases provided by fuel burned in the wind box or being injected into the bed with air as the fluidizing gas.

In any of these fluidized bed treatment operations it is generally desirable, for the sake of efficiency, to have the desired reaction completed as nearly as possible within the confines of the fluidized bed at the desired reaction or combustion temperatures. This is in order that the reaction may proceed under optimum and well controlled conditions and that the stack gas temperature may then be kept low enough to protect the air preheater unit against destructive overheating.

However, such optimum conditions are rarely if ever attainable in the practical operation of the reactor because of the phenomenon of "after burning" that occurs in the free board space in a zone directly above the fluidized bed. As a result of such after burning of unburned or unreacted gases and dust particle rising from the bed, the temperature in the free board space, herein termed the free board temperature, may rise even higher than a desired bed temperature. Excessively high stack gas temperatures in turn may require not only a special and expensive air preheater construction where conventional available air preheater units would fail, but would also produce increased radiation heat losses from the preheater itself. These air preheater units moreover have been subject to dust accumulation therein impairing their heat transfer efficiency.

To safeguard against objectionably high temperatures in the reaction chamber or free board space above the bed and consequently in the stack gases, such reactors have been equipped with temperature-responsive devices effective to control either the amount of excess combustion air introduced into the wind box or the proportion of the combustion air that is passed through the air preheater unit, or both, even though these control measures would reduce the overall efficiency of the treatment system.

It is therefore among the object of this invention to provide simple and inexpensive yet highly efficient air preheating means which avoid objectionably high free board and stack gas temperatures, heat radiation losses, and dust accumulation.

Another object is to provide a low cost air preheating construction of highly compact and flexible design readily adaptable to meet the requirements of a reactor of any type, capacity, shape, or size.

Still another object is to provide an air preheating construction that eliminates the need for conventional separate preheater units and the above stated drawbacks inherent thereto.

To attain these objects, the invention proposes to incorporate an air preheating heat exchange tube system directly into the reactor unit, exposed to the heat of the reaction gases in the free board space as well as to heat radiating from the adjacent areas of the roof and upright walls of the reactor. That is to say, an expansion-compensated heat exchange tube system is located in the free board space of the reaction chamber, preferably hung from the roof of the reactor and spaced a sufficient distance upwardly from the fluidized bed. Cool air forced into this tube system is heated rapidly and efficiently by the said exposure to combustion heat and radiation, and delivered preferably along the shortest route into the wind box of the reactor. In this way, heat is diverted and returned directly from the free board space and from the after burning zone to the fluidized bed. Consequently, when this system is in operating balance, the free board after burning temperatures and stack gas temperature become depressed, that is the heat gradient within the free board space is shifted downwardly, in favor of improved performance of the fluidized bed, and of greater overall thermal efficiency of the operation.

Also, heat radiation losses and dust accumulation are avoided, while design, production, and operating problems inherent in conventional separate air preheater units installations are eliminated. More specifically, this eliminates the expensive casing construction of conventional air preheater units.

One feature of the air preheating tube system of this invention lies in the provision of a plurality of parallel tube elements connected to a cool-air inlet header and a hot-air discharge header, and so constructed and arranged that the flow of air distributed equally through all tube elements.

In one embodiment, the air preheating heat exchange tube system has both the cool air and the hot air outlet end extending through the wall of the reactor.

In another embodiment, a depending hot air exit tube of the heat exchange tube system extends within the reactor chamber downwardly loosely through a vertical stationary sleeve provided in the constriction plate, said sleeve extending upwardly to a level above the fluidized bed. This allows for unrestricted longitudinal expansion of the depending tube end portion in the sleeve. A clearance between the tube and surrounding sleeve may be purged continuously by air or gas supplied to the wind box under pressure.

Other features and advantages will hereinafter appear.

FIG. 1 is a vertical sectional view of a fluidized bed reactor containing an air preheater tube system according to one embodiment of the invention with a depending hot air delivery pipe extending interiorly of the reactor through the constriction plate into the wind box chamber.

FIG. 4 is a fragmentary detail view of sealing means for the depending hot air delivery pipe.

FIG. 5 is a vertical sectional view of a fluidized bed reactor containing an air preheater tube system, according to another embodiment of the invention, with the hot air delivery pipe extending exteriorly of the reactor into the wind box chamber.

FIG. 7 is a detail lateral end view of the tube system, taken on line 7–7 in FIG. 5.

Figure 2:
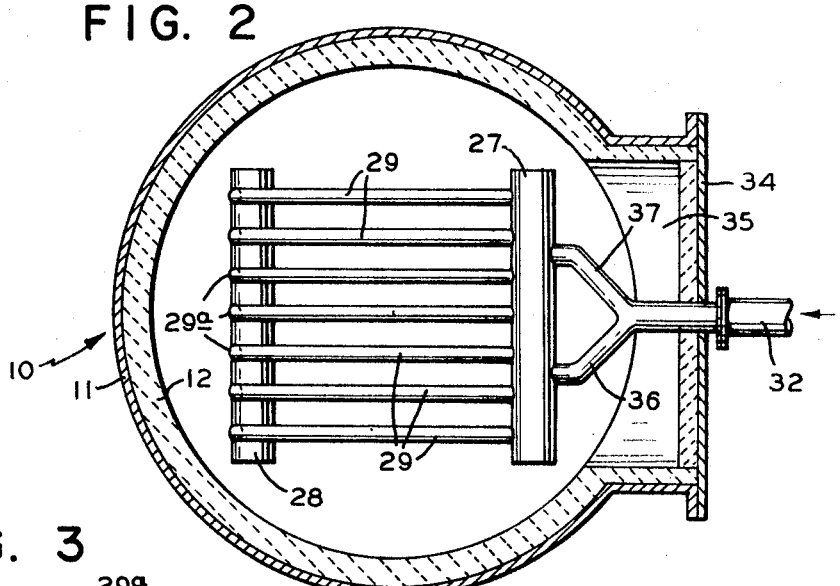
FIG. 2 is a cross-sectional view taken on line 2–2 in FIG. 1 showing a top view of the air preheater tube system.
Figure 3:
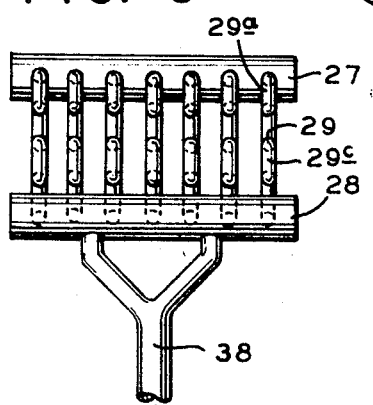
FIG. 3 is a detail lateral end view of the preheater tube system, taken on line 3–3 in FIG. 1.

The reactor as exemplified in the embodiment of FIGS. 1, 2, 3, 4, comprises a shell 10, that is a steel housing 11 having a refractory lining 12. The shell has a cylindrical upper portion 13, a cylindrical lower portion 14, and an intermediate interconnecting inverted truncoconical portion 15. A horizontal construction plate 16 located at the juncture of the portions 14 and 15 divides the shell into a reaction chamber 17 above, and a wind box chamber 18 below. A fluidizing gas being fed into the wind box under pressure will sustain a bed 19 of the material being treated in a fluidized state. The gas passes through openings 20 in the constriction plate, provided with well known nozzles or so-called tuyeres 21 designed to prevent the bed material from gravitating down into the wind box in case of shutdown when the gas pressure in the wind box ceases.

The top 22 of the reactor shell has a stack 23 for the escape of the combustion or reaction gases rising from the bed. The material is supplied at a controlled rate for instance by a feeder 24 connected to the reactor shell, and operating in such a manner that gases from the reaction chamber will not escape therethrough. Treated material may pass from the bed through a discharge connection 25 having a closure valve 25a, unless the material is of a kind that is to be subjected to total destruction by combustion in the bed.

According to the invention, the combustion air is preheated by the combustion gases in an air preheater tube system provided or suspended within the reactor unit itself, that is within the free board space S above the fluidized bed. The preheater is thus exposed to the heat of the reaction gases as well as to heat radiation from the reactor walls.

The air preheater in the embodiment of FIG. 1 is in the form of a heat exchange tube system 26 which comprises an air inlet header 27, an air outlet heater 28, and a plurality of heat exchange tubes 29 interconnecting the two headers which are horizontal and parallel to each other. This tube system is suspended from the roof of the reactor by means of hangers such as chains 30, a distance D from the top level of the fluidized bed. Each of the heat exchange tubes 29 has a plurality of loops 29a, 29b, 29c, 29d which loops in turn have suspension links 31 connecting them with one another. In this way, the heat exchange tube system is located in the upper portion of the free board space adjacent to the roof, so as to extend horizontally over a substantial area of the free board space. Thus, the tube system is exposed to the heat of the reaction gas as well as to the heat radiation of the refractory lining of the roof and of the surrounding walls, yet adequately spaced from the fluidized bed.

Cool air enters the inlet header through a branch pipe 32 leading from a main pressure air supply pipe 33 upwardly, and then through a coverplate 34 closing an access opening or neck 35 of the reactor shell. According to FIG. 2 this pipe 32 in turn has a pair of terminal branches 36 and 37 connecting it with the inlet header 27 symmetrically, that is in a manner whereby substantially equal air flow distribution is attainable through the tubes 29. A similar Y-shaped branch tube arrangement connects the outlet header 29 with a depending pipe 38 extending within the reactor through the constriction plate for delivery of hot combustion air into the wind box chamber.

The depending pipe extends loosely through a stationary tubular sleeve 39 fixed in the constriction plate, to allow for longitudinal vertical heat expansion of the tube. The sleeve extending upwardly a sufficient distance $d$ above the top level of the fluidized bed, is preferably in the form indicated in FIG. 4, wherein the length of the sleeve surrounds the pipe with a wide clearance C–1 while the top end of the sleeve has a constriction 39a reducing the clearance to a narrow width C–2. Due to the air pressure in the wind box chamber there will be small amount of purging air escaping through the constriction upwardly into the fluidized bed. The system of pipe loops representing the heat exchanger, may be connected to, or be severed from pipes 32 and 38 as indicated by the severing lines V–V and W–W.

The main pressure air supply pipe 33 has a second branch pipe 40 leading into the wind box chamber, and provided with a valve or damper 41 which is operable so as to vary the proportions of combustion air, entering the wind box chamber directly, and entering the tube system respectively. Such control may be called for, in order to maintain a desired free board temperature which may be subject to fluctuations due to the occurrence of variations in the caloric value or moisture content of the feed material.

Such temperature control may be effected automatically as by a thermocouple activating the damper 41 through a relay device. The control may be derived as from a thermocouple 44 in the fluidized bed, or a thermocouple 45 in the wind box chamber, or a thermocouple 45a in the free board space, or any combination thereof actuating the damper through a relay device 46 which of itself may be of a commercially available construction. A fuel burner 47 may provide hot treatment gases for the material in the fluidized bed. Combustion air supply and fuel supply for this burner are indicated at 48 and 49 respectively.

In another embodiment in FIG. 5 of the invention, only the arrangement of the air preheater tube system differs from that in FIG. 1. Accordingly, all those component parts of the reactor, that are identical to those of FIG. 1 have been designated by identical numerals.

This air preheater system differs from that in FIG. 1, in that hot air from the heat exchange tube system is delivered into the wind box through a pipe connection extending exteriorly of the reactor shell. Also the cool air inlet and the hot air outlet connections for the tube system are arranged different, and in a manner to provide a pattern of fully equalized air flow distribution through the heat exchanger tubes.

The access opening in the reactor shell is dimensioned and designed to allow for the passage therethrough of the preheater tube system, if the same is severed at its end from respective inlet and outlet pipes, as indicated by the dot-and-dash severing lines X–X and Y–Y (see FIG. 6) respectively.

Accordingly, the tube system 50 comprises a cool-air inlet header 51 and a hot-air outlet 52, both extending horizontally and spaced vertically directly one above the other. A plurality of heat exchange tubes 53 interconnects the two headers, said tubes extending in respective vertical planes, which planes in turn are parallel to one another. The tubes are shown to be identical and registering laterally with one another, each tube comprising a plurality of loops 53a.

Figure 6:
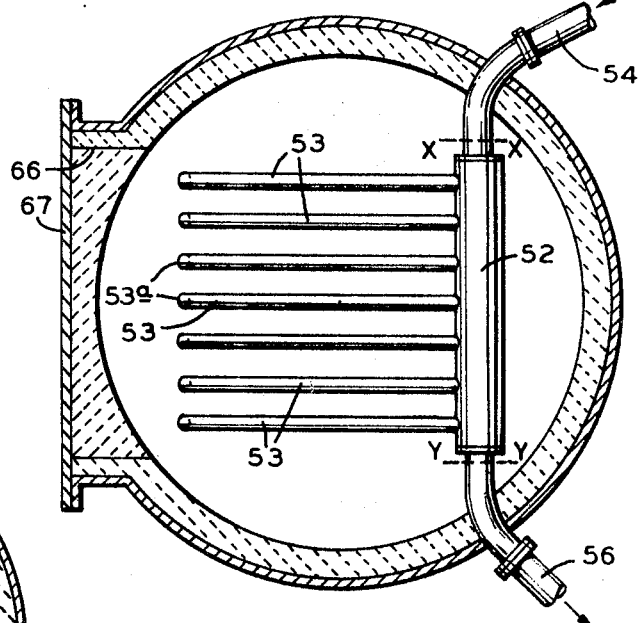
FIG. 6 is a cross-sectional view taken on line 6–6 of FIG. 5, showing a plan view of the air preheater tube system.

From FIGS. 6 and 7 it will be seen that the inlet header 51 has the inlet end 51a thereof connected to a cool air supply pipe 54 which is a branch of the main pressure air supply pipe 55. The outlet header 52 has the outlet end 52a thereof connected to a hot-air discharge pipe 56 passing horizontally through the reactor shell and then exteriorly thereof downwardly, with a horizontal lower end portion 57 of the pipe terminating in the wind box chamber. An expansion joint 58 is shown in this hot-air pipe connection.

Figure 8:
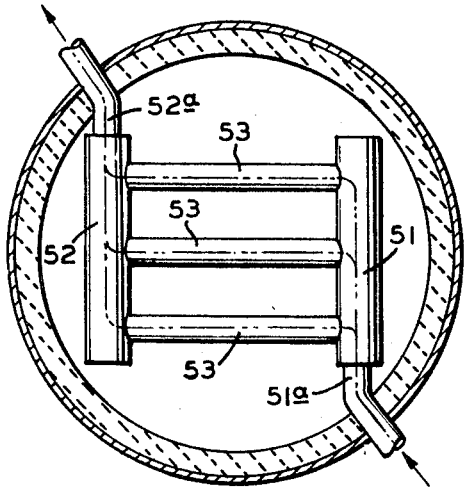
FIG. 8 is a diagrammatic rendition of the tube system of FIG. 6 and 7, illustrating the equalized distribution of air flow through the tubes.

From the sectional view of FIG. 7 and the schematic view of FIG. 8 it may be seen that the flow resistance through the parallel air preheater tubes is fully equalized. As in FIG. 1, the main pressure air supply pipe 55 has a second branch pipe 59 leading directly into the wind box chamber, and equipped with damper 60 activated selectively from respective thermocouples 61, 62, and 63 through a relay instrument 63a. An access opening 66 in the shell closed by a cover plate 67, allows for the removal passage therethrough of the preheater tube system, as indicated by the severance lines X-X and Y-Y (see FIG. 6) across the inlet and outlet tubes respectively.

This tube system is suspended from the reactor roof in a manner similar to that of FIG. 1, namely by means of hangers 64, and suspension links 65 between the loops.

It will be understood that the invention featuring the built-in-air-preheating tube system, is not limited to any shape or form of the reactor, although only a cylindrical reactor shell is shown to illustrate this invention. For example, the reactor may be of elongate rectangular shape, with an air preheater tube system suspended from the roof, comprising straight parallel tubes coextensive with the longitudinal extend of such a reactor unit. Nor is the construction of the wind box chamber shown to be construed as limiting the invention, provided it is effective to contain the fluidizing pressure and to sustain the material in the fluidizing state.

The mode of operating the reactor including the air preheating tube system, and the manner of operating control, depends upon the nature of the material to be heat treated, to be reacted, or to be burned. Accordingly, some conditions may require only a part of the combustion air to be passed through the preheating system, while the balance is introduced directly into the wind box chamber. Other conditions may require all of the combustion air to be passed through the preheating system, while still other conditions may require, in addition to total air preheating, the supply of additional fuel into fluidized bed or into the wind box chamber.

For example, in the case of burning moist raw sewage sludge in a hot bed of fluidized sand, temperatures in the reactor may have to be controlled in order to attain complete and odorless combustion at high enough fluidized bed temperatures. If the sludge be either high in moisture or low in caloric value, or both, supplemental fuel supply may be needed in addition to preheating of all of the combustion air, in order that complete and odorless combustion may be realized. At the other extreme, with high caloric value and low moisture, complete combustion may require the preheating of only part of the combustion air. However, with this invention, sufficiently high bed temperatures for complete and odorless combustion are maintainable, even while avoiding excessive free board and/or a stack gas temperatures.

In the case of partial roasting of a sulfide ore such as pyrite, in the reactor equipped according to this invention, the operation is as follows.

The feed material, in slurry form or as filter cake or in dry form, enters the reactor through an appropriate feed system. The reaction is one where part of the sulfur content is burned off. Depending on the amount of sulfur to be eliminated from the feed material and depending on the moisture content of the feed, the reaction might or might not require additional heat; but preheating the fluidizing air could make the process self-sustaining, requiring no additional fuel.

I claim:

1. A continuously operating fluidized bed reactor which comprises an upright shell, a horizontal constriction plate dividing the shell into a wind box chamber underneath, and a refractory-lined reaction chamber above the constriction plate, said constriction plate being adapted to support a bed of fluidized material for at least partial combustion, a roof closing the upper end of said shell, and defining a free board space between it and the fluidized bed, and having a stack gas duct communicating with said free board space, providing an outlet for spent fluidizing gas;

supply means for feeding said material to said fluidized bed;

a heat exchange tube system having an inlet end and an outlet end, located in the upper portion of said free board space adjacent to said roof, and extending horizontally over a substantial area of said free board space, said system thus being exposed to the heat of the reaction gas as well as to the heat radiation from the refractory lining of the roof, and of the surrounding walls, yet adequately spaced from the fluidized bed;

a pressure air supply;

a feed conduit connected to said inlet end of the tube system, for supplying cool air into the system from said air supply; and an air discharge conduit connected to said outlet end of the tube system, and constructed and arranged for delivering hot combustion air to said wind box of the reactor.

2. The reactor according to claim 1 wherein said tube system is suspended from said roof.

3. The reactor according to claim 1, wherein said heat exchange tube system has an horizontal inlet header, a similar horizontal outlet header vertically spaced from, and parallel to said inlet header, and a plurality of tubes interconnecting said headers, each tube formed with a plurality of loops extending in a vertical plane.

4. The reactor according to claim 1, wherein said heat exchange tube system has an horizontal inlet header, a similar horizontal outlet header spaced from and parallel to said inlet header, and a plurality of tubes interconnecting said headers, each tube formed with a plurality of loops extending in a vertical plane.

5. A continuously operating fluidized bed reactor which comprises a reactor shell having a horizontal constriction plate dividing the shell into a wind box chamber underneath, and a refractory-lined reaction chamber above the constriction plate, said constriction plate being adapted to support a bed of fluidized material for at least partial combustion, supply means for feeding said material to said fluidized bed, an outlet for spent fluidizing gas, a heat exchange tube system located in the free board space above the fluidized bed, exposed to the heat of the reaction in said reaction chamber, as well as to the radiation heat from the reactor walls, and having an inlet end and an outlet end.

a pressure air supply, feed conduit means connected to said inlet end of the tube system, for supplying cool air into the system from said pressure air supply, and an air discharge conduit connected to said outlet end of the tube system, and constructed and arranged for delivering hot combustion air to said wind box of the reactor, said discharge conduit comprising a depending tubular leg arranged for the delivery of hot air downwardly through said constriction plate into said wind box chamber, and a sleeve loosely surrounding said tubular leg in fixed relation to said constriction plate, and extending upwardly to an elevation substantially above the top of the fluidized bed, the clearance between said tubular leg and the surrounding sleeve being purged from the wind box pressure of the fluidizing air.

6. The reactor according to claim 5, wherein said heat exchange tube system comprises an upper horizontal inlet header, a similar horizontal lower outlet header spaced downwardly and parallel to said inlet header, and a plurality of tubes interconnecting said headers, and wherein said air inlet conduit is connected to said upper inlet header, and said air discharge conduit is connected to said lower outlet header.

7. The reactor according to claim 5, wherein said heat exchange tube system has an horizontal inlet header, a similar horizontal outlet header, and a plurality of tubes interconnecting said headers, each tube formed with a plurality of loops extending in a vertical plane.

8. The reactor according to claim 5, with the addition of temperature responsive means effective to control the rate of cool air supply to the heat exchange system relative to temperatures in the reactor.

9. The reactor according to claim 5, wherein said pressure air supply has a supply conduit leading into said wind box chamber, wherein said feed conduit means is a branch pipe connected to said supply conduit, and wherein control means are provided for automatically varying the proportions of combustion air passing directly into the wind box chamber and into the tube system respectively in response to temperatures in the reactor.

10. The reactor according to claim 9, wherein said control means comprise a throttling device in said supply pipe, provided downstream from said branch pipe, and automatically activated by said temperature-responsive means.

11. A continuously operating fluidized bed reactor which comprises a reactor shell having a stack gas conduit leading from the top end portion of said shell, and further having a horizontal construction plate dividing the shell into a wind box chamber underneath, and a refractory-lined reaction chamber above the constriction plate, said constriction plate being adapted to support a bed of fluidized material for at least partial combustion, supply means for feeding said material to said fluidized bed, an outlet for spent fluidizing gas, a heat exchange tube system located in the free board space above the fluidized bed, exposed to the heat of the reaction in said reaction chamber, as well as to the radiation heat from the reactor walls, and having an inlet end and an outlet end, a pressure air supply, feed conduit means connected to said inlet end of the tube system, for supplying cool air into the system from said pressure air supply, an air discharge conduit connected to said outlet end of the tube system and constructed and arranged for delivering hot combustion air to said wind box of the reactor, and temperature-responsive means effective to control the rate of cool air supply to the tube system relative to temperature in the reactor.

12. The reactor according to claim 11, wherein said pressure air supply has a supply conduit leading into said wind box chamber, wherein said feed conduit means is a branch pipe connected to said supply conduit, and wherein control means are provided for automatically varying the porportions of combustion air passing directly into the wind box chamber and into the tube system respectively in response to temperatures in the reactor.

13. A continuously operating fluidized bed reactor which comprises a reactor shell having a horizontal constriction plate dividing the shell into a wind box chamber underneath, and a refractory-lined reaction chamber above the constriction plate, said constriction plate being adapted to support a bed of fluidized material for at least partial combustion, supply means for feeding said material to said fluidized bed, an outlet for spent fluidizing gas, a heat exchange tube system located in the free board space above the fluidized bed, exposed to the heat of the reaction in said reaction chamber, as well as to the radiation heat from the reactor walls, and having an inlet end and an outlet end, a pressure air supply, feed conduit means connected to said inlet end of the tube system, for supplying cool air into the system from said pressure air supply, and an air discharge conduit connected to said outlet end of the tube system and constructed and arranged for delivering hot combustion air to said wind box of the reactor, said discharge conduit comprising a depending tubular leg constructed and arranged for the delivery of hot air downwardly through said constriction plate into said wind box chamber.